United States Patent Office 3,225,118
Patented Dec. 21, 1965

3,225,118
POLYSTYRENE CONTAINING THERMOPLASTIC POLYHYDROXY ETHER
Frank A. De Melio, Middlesex County, N.J., assignor to Union Carbide Corporation, a corporation of New York
No Drawing. Filed Feb. 12, 1962, Ser. No. 172,778
5 Claims. (Cl. 260—874)

This invention relates to styrene polymer compositions having lowered coefficients of friction. More particularly the invention relates to shaped articles comprising styrene polymers especially films of polystyrene which exhibit low coefficients of friction in contact with themselves or metals.

Styrene polymers, e.g. styrene homopolymer and styrene/acrylonitrile copolymer are formable into useful packaging materials, especially films, which, offer barrier, gloss and clarity and other properties superior to presently used materials, such as cellophane. A major drawback to their further adoption by the packaging industry has been the difficulty of automating packaging lines using styrene polymer. The difficulty lies in the relatively poor slipping qualities, manifested by high coefficients of friction, of the styrene polymers. Polystyrene film for example, has a coefficient of friction when moved against itself generally of 0.55 or more which is too great to allow utilization of the film in high speed packaging machinery.

Numerous expedients have been proposed and attempted in the past to overcome the "blocking" tendency of styrene polymer.

Coatings are widely used but require additional processing steps which increase costs.

Incorporation of various additives including greases, oils and surfactants, in the styrene polymer, prior to fabrication has been attempted heretofore but with the result that if slip properties were improved, some other desirable property of the styrene polymer would suffer, e.g. a film thereof would be hazy or would develop cloudiness and surface gloss would be diminished.

It is, therefore, an object of the present invention to provide styrene polymer compositions wherein slip is improved to levels suitable for automatic, high speed packaging machinery without loss of essential optical properties, such as absence of haze, high gloss, good light transmission, and the like.

It has now been discovered that incorporation of from one to fifteen parts by weight, preferably from five to ten parts by weight of a thermoplastic polyhydroxyether into 100 parts by weight of a styrene polymer provides a styrene polymer composition undiminished in haze value, gloss, or light transmission and with a surprisingly reduced coefficient of friction.

The thermoplastic polyhydroxyether can be incorporated into the styrene polymer by any of the compounding techniques and means used in the plastics art to blend and interdisperse thermoplastic materials. Among such means are compounding mills, such as two-roll mills, and mixers such as Banbury mixers, solutions in mutual or compatible solvents and the like.

The term "thermoplastic polyhydroxyether" refers to substantially linear, gel free thermoplastic reaction products of a dihydric polynuclear phenol and an epihalohydrin which contain as the recurring unit a residue of the dihydric polynuclear phenol having the general formula —O—E—O— wherein E is the nucleus of the dihydric polynuclear phenol in which the hydroxyl groups are attached to different nuclei, and a group having the general formula:

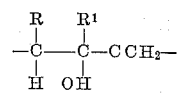

wherein R, and R¹ which can be the same or different are hydrogen or methyl, with the recurring units of the polyhydroxyether having the general formula:

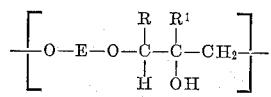

E, R and R¹ being as previously defined.

In general, a preferred process by which these thermoplastic polyhydroxyethers can be prepared is conducted by admixing a dihydric polynuclear phenol, from 0.985 to about 1.015 moles of an epihalohydrin preferably 0.985 mole per mole of dihydric polynuclear phenol together with from about 0.6 to about 1.5 moles, preferably about 1.25 moles, per mole of dihydric polynuclear phenol, of an alkali metal hydroxide such as sodium hydroxide, potassium hydroxide and the like, generally in an aqueous medium at a temperature of about 10° C. to about 50° C. preferably about 20° C. to about 40° C. until at least about 60 mole percent of the epihalohydrin has been consumed (conveniently determined by titrating an aliquot part of the mixture with 0.1 N HCl in order to determine the amount of unreacted alkali metal hydroxide, the amount of base consumed corresponding to the amount of reacted epihalohydrin) adjusting, if necessary, the amount of alkali metal hydroxide in the reaction mixture so that the final concentration of alkali in the aqueous phase of the reacted mixture, i.e., at the completion of the reaction, is at least about 0.1 molal preferably from about 0.3 to about 0.6 molal and heating the reaction mixture at a temperature of from about 60° C. to boiling or reflux until the polyhydroxyether produced has a sufficient reduced viscosity, preferably 0.45 and above measured as a 0.2 gram sample in 100 ml. tetrahydrofuran at 25° C. Amounts of alkali metal hydroxide used can be such that the molal concentration is greater than 0.6 if so desired.

It is also preferred to conduct the reaction between the dihydric polynuclear phenol and the epihalohydrin while the reactants are in the presence of, that is, in contact with, an inert, organic diluent, preferably a hydroxylate organic diluent, which is a solvent for the starting materials and is non-reactive with the final product. Using an organic diluent facilitates both agitation of the reaction mixture and recovery of the thermoplastic polyhydroxyether. It is customary to use the organic diluent in amounts of at least about 50 percent by weight based on the weight of the dihydric polynuclear phenol. The upper limit with respect to the amount or organic diluent used will depend upon the rate at which it is desired to conduct the reaction. The more dilute the reaction mixture, the slower the rate of reaction. In practice, the organic diluent is used in amounts up to about 500 percent by weight based on the weight of the dihydric polynuclear phenol.

Suitable organic diluents include, among others, the aromatic hydrocarbons, such as benzene, xylene and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as anisole and the like; alphatic hydrocarbons, such as n-hexane, n-heptane, and the like; ethers, such as dialkyl ethers, e.g. diethyl ether and the like; aliphatic ketones, such as acetone, methyl ethyl ketone, diethyl ketone and the like; and dimethyl sulfoxide.

Particularly desirable organic diluents, as stated, are the hydroxylated organic diluents such as the aliphatic alcohols having the general formula $R^3OH$ wherein $R^3$ is an alkyl group preferably containing from 1 to 10 carbon atoms inclusive. Specific compounds include among others methanol, ethanol, n-butanol, pentanol-3, n-hexanol and the like. Other hydroxylated organic diluents are ethylene glycol monobutyl ether, diethylene glycol monobutyl ether and the like, as well as aromatic alcohols such as benzyl alcohol and the like.

Mixtures of organic diluents can be used if so desired. The organic diluent can form part of the initial reaction mixture or can be added to the reaction mixture at convenient times during the course of the reaction.

Recovery of the thermoplastic polyhydroxyether, generally from an organic solution and/or from an aqueous medium can be accomplished by a variety of convenient methods. For example, the aqueous layer which may be present can be removed by decantation from the organic solution. The organic solution, containing the thermoplastic polyhydroxyether, can then be water washed in order to insure that any residual alkali metal hydroxide and alkali metal hydroxide salt is removed from the polyhydroxyether solution. An acid such as HCl, $H_3PO_4$, or acetic acid can then be added to the polyhydroxyether solution in order to convert any alkali metal hydroxide which may still be entrained to the corresponding salt which can be easily removed by a water wash. Any excess acid is also removed with water recovered by stripping off the solvent, as for example, by the use of a heated, two-roll mill or by coagulating the polyhydroxyether in a non-solvent such as isopropanol or a mixture of isopropanol and water and recovering the polyhydroxyether as a filter cake, generally a white powdery solid.

Particularly preferred as the dihydric polynuclear phenols are compounds having the general formula:

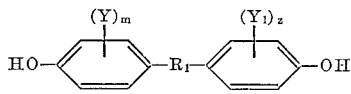

wherein $Y$, $Y_1$, which can be the same or different are alkyl radicals, preferably having a maximum of 4 carbon atoms, alkoxy radicals, preferably having a maximum of 4 carbon atoms or halogen, $m$ and $z$ have values of from 0 to 4 inclusive and $R_1$ is an alkylene or alkylidene group, preferably having from 1 to 3 carbon atoms inclusive or $R_1$ is a saturated group having the formula:

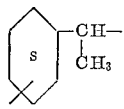

or

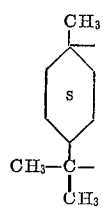

Thermoplastic polyhydroxyethers produced using the dihydric polynuclear phenols described in the preceding paragraph have extremely good mechanical properties. In addition, polyhydroxyethers producing using a dihydric polynuclear phenol wherein $R_1$ is a saturated group having the formula:

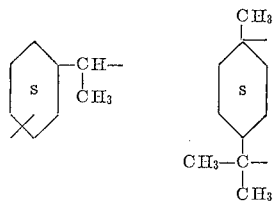

have heat distortion temperatures which are relatively high.

Examples of specific dihydric phenols include among others the bis-(hydroxyphenyl)-alkanes such as 2,2-bis-(4-hydroxyphenyl)-propane, commonly referred to as Bisphenol-A,
2,4'-dihydroxy diphenylmethane,
bis-(2-hydroxyphenyl)-methane,
bis-(4-hydroxyphenyl)-methane,
bis-(4-hydroxy-2,6-dimethyl-3-methoxyphenyl)-methane,
1,1-bis-(4-hydroxyphenyl)-ethane,
1,2-bis-(4-hydroxyphenyl)-ethane,
1,1-bis-(4-hydroxy-2-chlorophenyl)-ethane,
1,1-bis-(3,5-dimethyl-4-hydroxyphenyl)-ethane,
1,3-bis-(3-methyl-4-hydroxyphenyl)-propane,
2,2-bis-(3-phenyl-4-hydroxyphenyl)-propane,
2,2-bis-(3-isopropyl-4-hydroxyphenyl)-propane,
2,2-bis(2-isopropyl-4-hydroxyphenyl)-propane,
2,2-bis-(4-hydroxynaphthyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1,2-bis-(phenyl)-propane,
2,2-bis-(4-hydroxyphenyl)-1-phenylpropane and the like;
di-(hydroxyphenyl) sulfones such as
bis-(4-hydroxyphenyl)-sulfone,
2,4-dihydroxydiphenyl sulfone,
5'-chloro-2,4'-dihydroxydiphenyl sulfone,
5'-chloro-4,4'-dihydroxydiphenyl sulfone,
3'-chloro-4,4'-dihydroxydiphenyl sulfone,
3'-chloro-4,4'-dihydroxydiphenyl sulfone and the like;
di(hydroxyphenyl) ethers such as
bis-(4-hydroxyphenyl)-ether,
the 4,3'-, 4,2'-, 2,2'-, 2,3'-dihydroxy-diphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4'-dihydroxy-2,6-dimethoxy-diphenyl ether,
4,4'-dihydroxy-2,5-diethoxydiphenyl ether, and the like;
also suitable are
1,1-bis-(4-hydroxyphenyl)-1-phenylethane,
1-(4-hydroxyphenyl)-1-[(4-hydroxyphenyl)-cyclohexyl]ethane,
1,3,3-trimethyl-1-(4-hydroxyphenyl)-6-hydroxyindane,
2,4-bis-(4-hydroxyphenyl)-4-methylpentane,
bis-(4-hydroxyphenyl)-methane, and the like.

Specific epihalohydrins are epichlorohydrin, epibromohydrin, 1,2-epoxy-1-methyl-3-chloropropane and 1,2-epoxy-2-methyl-3-chloropropane.

The following examples are presented to illustrate the styrene polymer compositions of the present invention. All parts and percentages are by weight unless otherwise specified.

Example 1

One hundred parts of polystyrene (molecular weight of 50,000) was fluxed in a Banbury mixer with 5 parts of a thermoplastic polyhydroxyether. The material was then fluxed for 4 minutes on a 2 roll mill. Front roll temperature on the mill was 150–160° C.; the back roll temperature was 130–140° C. After 5 minutes of working on the mill, the material was sheeted. The sheets were compression molded into 8″ by 8″ by 0.04″ plaques. These plaques were then bi-axially stretched into approximately one mil film using a Formvac Sheet Tester. The coefficient of friction of the resulting polystyrene composition was measured as follows: The one mil film was wrapped around a metal sled weighing 1,000 grams and having dimensions of 2.5″ by 4″ by 0.75″. The film wrapped sled was placed on a piece of an unmodified film. The second piece of film was drawn away from the sled at a rate of 0.5 inch per minute. The sled was attached to a transducer and recorder to measure the force between the two films.

The coefficient of friction found for the composition of this example was 0.42. The coefficient of friction of an unmodified sample of this polystyrene, was 0.55.

Example 2

Example 1 was duplicated but employing 10 parts of the thermoplastic polyhydroxyether. The coefficient of friction of this composition was to be found to be 0.46.

In each of the foregoing examples no diminution in gloss or specular light transmission occurred. Haze was unchanged to remain at an extremely low level.

The thermoplastic polyhydroxyether used in the preceding examples was prepared as follows.

There was placed in a flask:

| | Parts |
|---|---|
| 2,2-bis(4-hydroxyphenyl)propane | 114.15 |
| Epichlorohydrin (99.1% pure) | 46.8 |
| Ethanol | 96.0 |
| Butanol | 10.0 |
| Sodium hydroxide (97.5% pure) | 22.6 |
| Water | 70.0 |

The above mixture was stirred at room temperature for sixteen hours to accomplish the initial coupling reaction. The mixture was then heated at 80° C. for an hour. Thereupon, approximately sixty-five parts of a 7:3 mixture of toluene:butanol was added to the flask. Heating of the mixture at 80° C. was continued another two hours. There was added to the flask an additional fifty-five parts of the 7:3 toluene:butanol mixture and 4.5 parts of phenol. The contents of the flask were continued heated at 80° C. (reflux) for two hours and then allowed to cool. Total reaction time at 80° C. was five hours. Upon cooling the reaction mixture was cut with about two hundred and twenty parts of the 7:3 toluene:butanol mixture. One hundred parts of water was added to the flask and agitated with the contents to dissolve salts present in the reaction mixture. The flask contents were allowed to settle for ten minutes, during which time a lower brine phase formed. This lower phase was separated by decantation. The upper polymer solution containing phase was washed successively with two one hundred sixty part portions of water containing 4.5 percent butanol. The washed polymer was then coagulated in isopropanol, filtered and dried.

Preferred as the styrene polymers of the present invention are polystyrenes having a Staudinger molecular weight of from 20,000 to 100,000, particularly from 40,000 to 65,000.

What is claimed is:

1. Polystyrene composition having good gloss and freedom from haze and a lowered coefficient of friction comprising 100 parts by weight of a normally solid polystyrene and incorporated thereinto from 1 to 15 parts by weight of a thermoplastic polyhydroxyether having recurring units of the general formula:

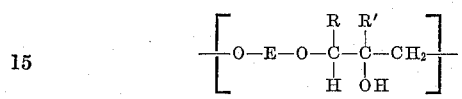

wherein E is the nucleus of a dihydric polynuclear phenol in which the hydroxyl groups are attached to different nuclei and each of R and R' is selected from the group consisting of hydrogen and methyl, said thermoplastic polyhydroxyether having a reduced viscosity of at least 0.45 when measured as a 0.2 gram sample in 100 milliliters of tetrahydrofuran at 25° C., and said thermoplastic polyhydroxyether being substantially free of 1,2-epoxy groups.

2. The composition claimed in claim 1 wherein the polystyrene has a molecular weight of 20,000 to 100,000.

3. The composition claimed in claim 1 wherein the polystyrene has a molecular weight of 40,000 to 65,000.

4. A film of the composition claimed in claim 3.

5. Polystyrene composition having good gloss and freedom from haze and a lowered coefficient of friction comprising 100 parts by weight of a normally solid polystyrene and incorporated thereinto from 5 to 10 parts by weight of a thermoplastic polyhydroxyether having recurring units of the general formula:

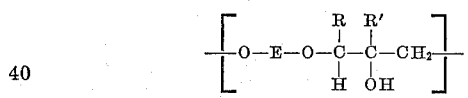

wherein E is the nucleus of a dihydric polynuclear phenol in which the hydroxyl groups are attached to different nuclei and each of R and R' is selected from the group consisting of hydrogen and methyl, said thermoplastic polyhydroxyether having a reduced viscosity of at least 0.45 when measured as a 0.2 gram sample in 100 milliliters of tetrahydrofuran at 25° C., and said thermoplastic polyhydroxyether being substantially free of 1,2-epoxy groups.

References Cited by the Examiner

UNITED STATES PATENTS

| | | | |
|---|---|---|---|
| 2,712,000 | 6/1955 | Zech | 260—837 |
| 2,843,557 | 7/1958 | Safford | 260—837 |
| 2,872,432 | 2/1959 | Metzger | 260—837 |
| 2,902,471 | 9/1959 | Bruin | 260—837 |
| 2,959,508 | 11/1960 | Graham et al. | 260—837 |
| 2,965,608 | 12/1960 | Martin et al. | 260—837 |

MURRAY TILLMAN, *Primary Examiner*.

LEON J. BERCOVITZ, *Examiner*.